June 6, 1939.  F. E. WOLCOTT  2,161,496
STOVE AND GRATE THEREFOR
Filed Jan. 2, 1937
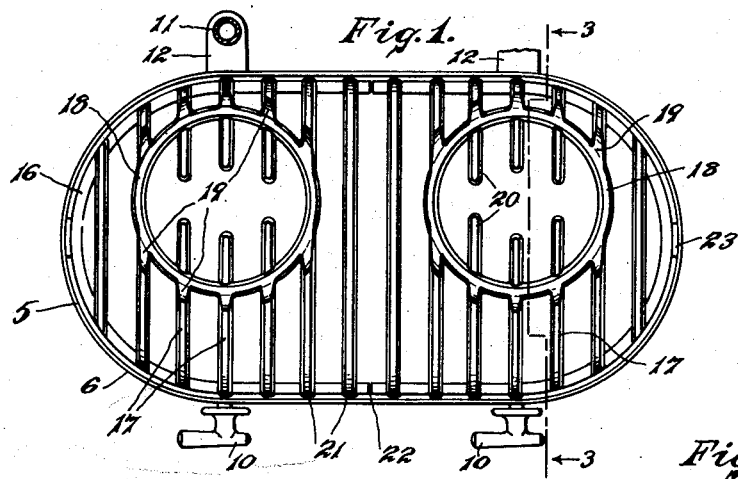
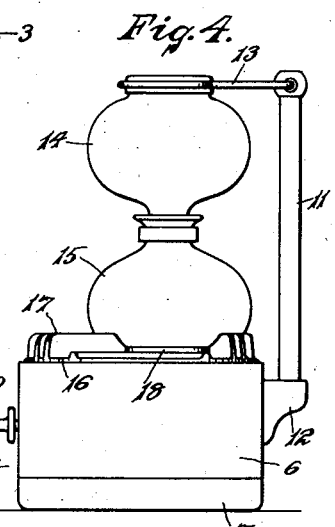
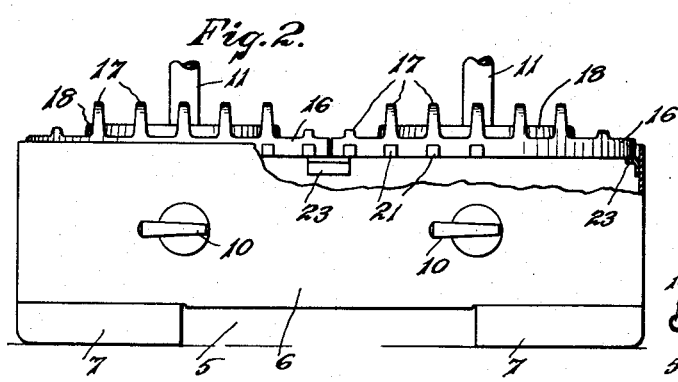
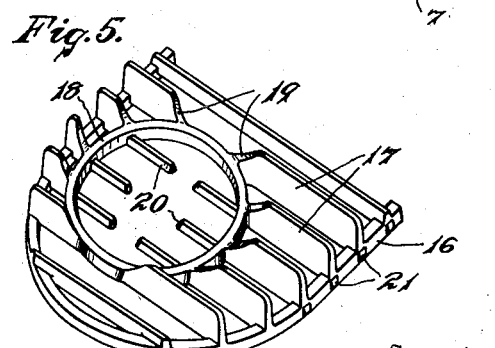
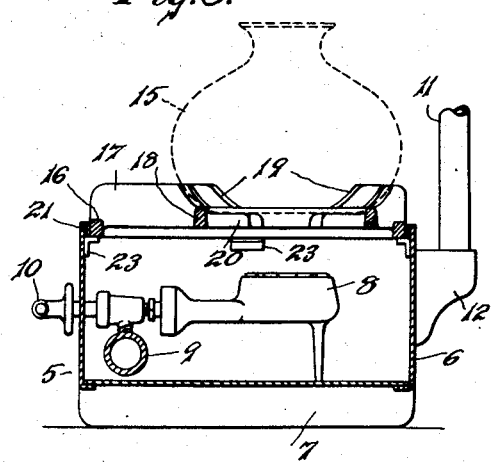
Inventor
FRANK E. WOLCOTT
By Louis V. Lucia
Attorney Patented June 6, 1939

2,161,496

UNITED STATES PATENT OFFICE 2,161,496

STOVE AND GRATE THEREFOR

Frank E. Wolcott, West Hartford, Conn., assignor to The Silex Company, Hartford, Conn., a corporation of Connecticut Application January 2, 1937, Serial No. 118,700

10 Claims. (Cl. 126—214)

This invention relates to stove and grate therefor and more particularly to that class of stoves which are intended to be used upon carriers such as ships, trains, airplanes, and the like, where the said stoves are used while subjected to motion and where it is desirable that they be provided with suitable means for retaining an appliance such as a coffee maker, or cooking utensil, thereupon against accidental displacement which may be caused by the motion of the carrier.

An object of this invention is to provide, for such stoves, a grate of novel construction and having means incorporated therein for positioning and retaining a utensil and, particularly a coffee maker, against displacement or tipping through the motion of the carrier on which the said stoves are used.

Further objects of my invention will be understood from the following specification and from the illustration in the accompanying drawing in which:—

Figure 1 is a plan view of a stove embodying my invention with some of the parts thereof broken away and others not shown.

Figure 2 is a front view thereof partly in section and with parts broken away.

Figure 3 is an end view in vertical section on line 3—3 of Figure 1.

Figure 4 is an end view, in elevation, illustrating the operation of my invention in connection with a coffee maker of the vacuum type.

Figure 5 is a perspective view of a section of my improved grate.

As illustrated in the drawing, the numeral 5 denotes a stove comprising a casing 6, that is mounted on feet 7—7 and contains burners 8 which are connected to a fuel supply pipe 9 and operated by means of valves having handles 10.

Upright standards 11 are mounted to said stove, preferably by means of brackets 12, and a retaining member, in the form of a wire holder 13, may be pivotally secured to each of said standards for engaging the top portion of a device such as a coffee maker, consisting of an upper bowl 14 and a lower bowl 15, and thereby preventing vertical displacement thereof.

My improved grate consists of a frame 16 having a plurality of supporting ribs 17 preferably integral therewith and extending across the said frame.

The said grate is provided with a sub-frame 18, preferably in the form of a ring extending through a number of the said ribs. The said ring is located on a plane below the top edges of said ribs which are cut away at the portions adjoining the said ring to form curved adjoining walls, as indicated at 19, and thereby provide a bowl shaped retaining portion in said grate adapted to receive a portion of the utensil such as the bowl 15 of the coffee maker shown. Supporting fingers 20 are provided and extend inwardly from said ring for supporting the utensil thereon.

The frame 16 of the grate may be provided with bosses 21 for spacing the said frame from the housing 6.

In the form illustrated in the drawing, the sub-frame 18, together with the surrounding bowl shaped recess provided by the upstanding supporting ribs 17, is located off-center with respect to the said grate. This is for the purpose of placing the appliance to be used on the said grate directly over the burner 8.

It will also be noted that in the form illustrated, the grate comprises two sections that are divided at 22 and supported in the housing 6 by means of brackets 23.

While I have shown and described one form of a stove comprising a grate embodying my invention, it is to be understood that the same may take various other forms and that the grate thereof may be made in various other shapes to conform therewith without departing from the scope of my invention as set forth in the appended claims.

I claim:

1. In combination with a stove of the character described comprising a housing, a burner, a grate forming a top for said housing and comprising a frame, parallel supporting ribs, a sub-frame supported on said ribs co-axially with said burner, and portions on said ribs extending above the plane of said sub-frame and terminating adjacent thereto to provide means for locating said utensil in position above said burner and retaining the same against axial displacement with relation thereto.

2. In combination with a stove of the character described comprising a housing having a burner mounted therein; a grate mounted on said housing and comprising a frame, supporting ribs on said frame, means in said supporting ribs for positioning a utensil thereon above said burner and against lateral displacement, an upright member, and a retaining member mounted upon said upright member and adapted to engage the upper portion of said utensil to prevent tipping thereof upon said grate.

3. A unitary grate of the character described comprising a frame, parallel supporting ribs extending across said frame, an annular sub-frame supported by a plurality of said ribs below the plane thereof, and extensions on said sub-frame for supporting an article thereon; the said plurality of ribs being formed with a portion of the ends thereof converging into abutment with the said sub-frame and thereby providing with the remaining portion of said ribs a substantially bowl shaped recess co-axial with said sub-frame for substantially positioning an article against lateral displacement with relation thereto.

4. For a stove of the character described, a top in the form of a grate comprising a frame, supporting ribs formed to provide a bowl-shaped recess for locating a utensil against lateral displacement thereon and a sub-frame supported by said ribs within said recess.

5. A grate comprising a frame, supporting ribs disposed in parallel and transversely upon said frame, a ring-shaped sub-frame mounted in said ribs and disposed on a plane below the plane of the tops of said ribs and projections extending inwardly from said sub-frame.

6. A stove of the character described comprising a housing, a grate mounted in said housing, ribs in said grate having a recess therein, a sub-frame in said recess adapted to support a utensil against lateral displacement upon said grate, a bracket mounted on said housing, a post extending vertically from said bracket and a retaining member swivelly mounted to said post and adapted to engage the upper portion of said utensil and retain the same on said grate to prevent tipping thereof.

7. In a stove of the character described, a housing comprising a vertical wall surrounding said stove, supporting brackets within said housing and adjacent the top of said wall, and a grate mounted on said brackets and comprising a plurality of bars formed to provide a depression in the top thereof for positioning an article thereon against lateral displacement.

8. A stove of the character described comprising a continuous vertical wall forming a housing surrounding said stove, a grate fitting within said housing and surrounded by the top edge portion thereof and a plurality of ribs on said grate formed to provide a depression therein for positioning an article against displacement thereon.

9. For a stove of the character described, a unitary grate comprising a frame, a sub-frame, supporting ribs having supporting surfaces disposed on a plane above the plane of said sub-frame, curved surfaces on said supporting ribs converging downwardly from the plane of said supporting surfaces to the plane of said sub-frame; the said curved surfaces being disposed adjacent to and terminating onto said sub-frame and thereby providing a bowl shaped depression in said grate for positioning an article against lateral displacement with relation to said sub-frame.

10. A grate of the character described comprising an integral structure including a frame portion, parallel supporting ribs in said frame, a ring shaped portion in said grate and parallel supporting fingers extending inwardly from said ring portion; the top surface of said fingers being on a plane below the top surface of said ring.

FRANK E. WOLCOTT.